United States Patent [19]
Taguchi et al.

[11] Patent Number: 5,213,301
[45] Date of Patent: May 25, 1993

[54] SUSPENSION SYSTEM FOR ISOLATING VIBRATIONS

[75] Inventors: Masami Taguchi, Minneapolis; Timothy P. Sheridan, St. Louis Park, both of Minn.

[73] Assignee: The Perkin-Elmer Corp., Norwalk, Conn.

[21] Appl. No.: 809,691

[22] Filed: Dec. 17, 1991

[51] Int. Cl.$^5$ .......................................... F16M 13/00
[52] U.S. Cl. ...................................... 248/611; 267/73; 267/168; 267/178; 267/179; 267/203; 267/290; 267/291; 248/621
[58] Field of Search ............... 267/203, 202, 201, 290, 267/291, 289, 168, 169, 178, 179, 152, 33, 212, 69, 73, 213, 214; 248/610, 611, 621

[56] References Cited

U.S. PATENT DOCUMENTS

| | | | |
|---|---|---|---|
| 373,640 | 11/1887 | Brill | 267/33 |
| 2,010,623 | 8/1935 | Bugatti | 267/203 |
| 2,883,130 | 4/1959 | Rose | 248/621 |
| 2,929,592 | 3/1960 | Spaetgens | 248/621 |
| 3,399,879 | 9/1968 | Hojo et al. | 267/291 |
| 3,474,992 | 10/1969 | Schuck et al. | 248/621 |
| 3,889,937 | 6/1975 | Statler | 267/202 |
| 4,025,011 | 5/1977 | Rapps | 267/69 X |
| 4,653,736 | 3/1987 | Pontoppidan | 267/168 X |
| 4,854,559 | 8/1989 | Fialon | 267/168 X |

OTHER PUBLICATIONS

"Scanning Tunneling Microscopy for Surface Science" by Sang-il Park, G. L. No. 4130 (Stanford University 1987).
"Vibration Isolation for Scanning Tunneling Microscopy" by M. Okano, K. Kajimuru, S. Wakiyama, F. Sakai, W. Mizutani, and M. Ono, J. Vac Sci. Technol. A5(6), 3313–3320 (1987).

Primary Examiner—George E. A. Halvosa
Attorney, Agent, or Firm—H.S. Ingham; E.T. Grimes

[57] ABSTRACT

A suspension system for isolating a platform from external vibrations includes spring assemblies suspending the platform. In each spring assembly an elongated outer coil spring is suspended at an upper end thereof from a support structure. A tube is disposed loosely within the outer spring and is attached to a lower end of the spring so as to extend upwardly. An elongated inner coil spring is disposed loosely within the tube and is suspended from an upper point of the tube. The inner spring has a lower end attached to the platform. For friction dampening, o-rings are fitted on the inner spring in sliding contact with the tube.

3 Claims, 1 Drawing Sheet

SUSPENSION SYSTEM FOR ISOLATING VIBRATIONS

This invention relates to suspension systems for isolating vibrations, and particularly to a suspension system for isolating vibrations from a highly sensitive instrument such as a scanning tunneling microscope.

BACKGROUND OF THE INVENTION

Many scientific instruments are sensitive to vibrations from external sources, since such vibrations interfere with accurate measurements. An example of such an instrument is a scanning tunneling microscope which is used to study surfaces down to atomic accuracy. A fine metal tip is scanned just above a sample during an analysis, and any vibration distorts results.

The problem is addressed in several publications: a dissertation "Scanning Tunneling Microscopy for Surface Science" by Sang-il Park, G. L, No. 4130 (Stanford University 1987); and an article "Vibration Isolation for Scanning Tunneling Microscopy" by M. Okano, K. Kajimura, S. Wakiyama, F. Sakai, W. Mizutani, and M. Ono, J. Vac. Sci. Technol. A5(6), 3313–3320 (1987). Both publications disclose an outer stage suspended by one set of springs, and an inner stage suspended from the outer stage by another set of springs. Dampening of oscillations is effected with magnets. These arrangements require a significant amount of space, and eddy currents from magnets can interfere with the process of acquiring data using surface analysis techniques.

Therefore, an object of the invention is to provide a novel suspension system for isolating a platform from external vibrations. Another object is to provide such a system which utilizes a minimum of space. A further object is to provide a novel suspension system with non-magnetic dampening.

SUMMARY OF THE INVENTION

The foregoing and other objects are achieved by a suspension system that includes a platform to be isolated from external vibrations. A support structure has at least one elevated support section. At least one spring assembly is connected between an associated support section and the platform. In each spring assembly an elongated outer coil spring is suspended at an upper end thereof from the associated support section. An arm, preferably in the form of a tubular member, is disposed loosely within the outer spring and is attached to a lower end of the spring so as to extend upwardly. An elongated inner coil spring is disposed loosely within the tubular member and is suspended from an upper point of the tubular member. The inner spring has a lower end attached to the platform.

According an embodiment to effect friction dampening of oscillations in the assembly, at least one ring member is fitted on the inner spring in sliding contact with the tubular member. The ring member should be elastomeric. It also is desirable to provide the attachment points of the springs and tubular member with elastomeric components disposed to isolate the platform from high frequency vibration.

DETAILED DESCRIPTION OF THE INVENTION

Figure 1:
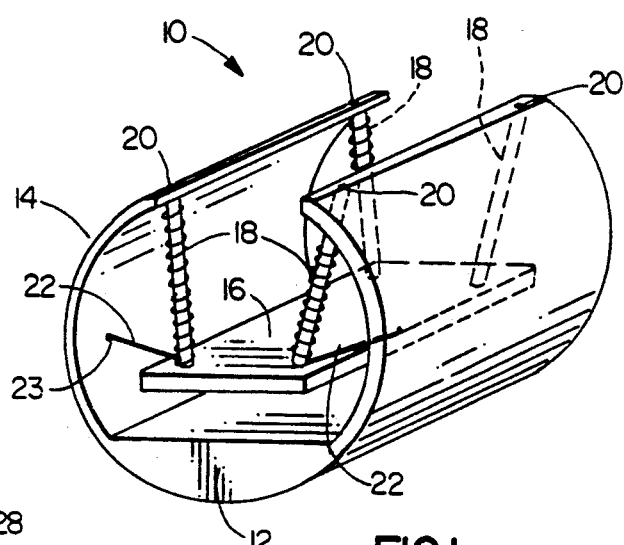
FIG. 1 is a perspective of a suspension system of the invention.

FIG. 1 illustrates a preferred arrangement for a suspension system 10 of the invention. A base 12 has a support structure 14 extending upwardly therefrom, illustratively in the form of a cylindrically sectioned body. A platform 16 to be isolated from external vibrations is supported within the body. Such a platform may retain equipment components (not shown) to be so isolated, for example a tunneling assembly of a scanning tunneling microscope. One or more, e.g. four, spring assemblies 18 are connected between the support structure and the platform, so as to suspend the platform. Each assembly is attached to the support structure at an associated elevated support section 20 of the structure. To stabilize the platform, each spring assembly may further comprise an elastic member 22 such as a o-ring retained in tension between the lower end of the outer spring and a pin 23 on an adjacent portion of the support structure.

Each spring assembly 18 (FIG. 2) includes an elongated outer coil spring 24 suspended at the upper end 26 thereof from an associated support section 20, with an upper attachment means 28. An arm, preferably in the form of a tubular member 30, is disposed loosely within the outer spring and affixed to the lower end 32 thereof so as to extend upwardly within the spring. An elongated inner coil spring 34 is disposed loosely within the outer spring 24 and, in the case of the arm being a tube, is more specifically disposed loosely within the tube 30. The inner spring 34 is suspended from the upper end 36 of the tube with an intermediate attachment means 38. The lower end 40 of the inner spring is attached via a lower attachment means 42 to the platform 16.

In a preferred embodiment the spring assembly 18 further comprises at least one ring member 44 fitted on the inner spring in sliding contact with the tube so as to effect friction dampening of oscillations in the assembly. Advantageously there are several such rings, for example three as shown. The rings should be elastomeric, Viton o-rings being suitable. The tube is advantageously formed, at least on the inner surface, of polytetrafluoroethylene or other such low friction material to provide a low, but significant, friction surface for the o-rings. Thus dampening is effected non-magnetically. Preferably all components are non-magnetic, for example stainless steel except as otherwise indicated herein.

Figure 2:
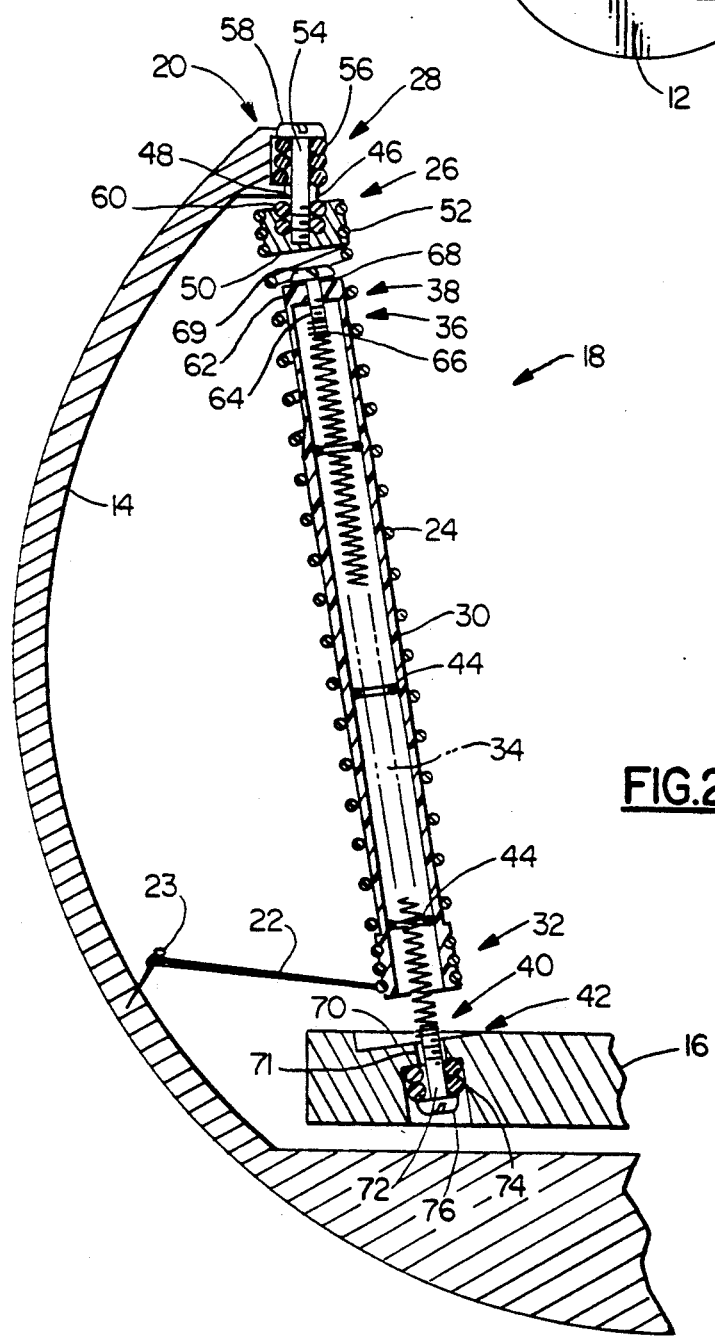
FIG. 2 is a detail of a suspension assembly component of FIG. 1.

Preferred arrangements for the attachment means are shown in FIG. 2. The upper attachment 28 comprises the associated support section 20 having an upper flange portion 46 with an opening 48 therethrough. A connector 50 is secured to the upper end 26 of the outer spring 24, for example by threading the spring onto corresponding threads 52 on the connector. An upper pin 54 passes through the flange 46 and is attached to the connector 50 by threading into a hole therein, so as to affix the pin to the outer spring. An alternative (not shown) is to utilize a larger pin that is threaded directly onto the spring.

At least one elastomeric ring 56, and preferably about three stacked rings as shown, are retained between the flange 46 and the head 58 of the pin. A couple more such rings 60 are also retained between the flange 46 and the connector 50, so that the entire ring assembly is under slight compression. Viton o-rings are suitable in the attachment assemblies which provide for isolation of the platform from higher frequency vibrations.

The intermediate attachment means 38 has a similar arrangement. The tube 30 has an intermediate flange portion 62 with a hole at the upper end of the tube. An intermediate pin 64 passes through this flange and is affixed to the upper end 66 of the inner spring by threading the spring onto the threaded pin. Another pair of o-rings 68 for further high frequency filtering is retained between the pin head 69 and the intermediate flange 62.

The lower attachment means 42 comprises the platform 16 having a lower flange portion 70 therein with a hole 71. A lower pin 72 passes through this flange and is affixed to the lower end 40 of the inner spring 34 by threading. A further pair of o-rings 74 is retained between the flange and the head of the pin 76, for further isolation of high frequencies.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

I claim:

1. A suspension system including a platform to be isolated from external vibrations, a support structure with at least one elevated support section, and at least one spring assembly connected between an associated support section and the platform, wherein each spring assembly comprises:

an elongated outer coil spring suspended at an upper end thereof from the associated support section;
    a tubular member disposed loosely within the outer spring and attached to a lower end thereof so as to extend upwardly, the tubular member having an inner surface formed of a low friction material;
    an elongated inner coil spring disposed loosely within the tubular member and suspended from an upper point of the tubular member, the inner spring having a lower end attached to the platform;
    at least one elastomeric ring member fitted on the inner spring in sliding contact with the low friction material of the tubular member so as to effect friction dampening of oscillations in the assembly;
    upper attachment means for suspending the outer spring from the associated support section, comprising the associated support section having an upper flange portion, and further comprising an upper pin passing through the upper flange portion and being affixed to the upper end of the outer spring;
    intermediate attachment means for suspending the inner spring from the tubular member, comprising the tubular member having an intermediate flange portion at the intermediate attachment means, and further comprising an intermediate pin passing through the intermediate flange portion and being affixed to an upper end of the inner spring, and lower attachment means for attaching the inner spring to the platfform, comprising the platform having a lower flange portion therein, and further comprising a lower pin passing through the lower flange portion and being affixed to the lower end of the inner spring;
    each attachment means further comprising at least one elastomeric ring component retained between the flange portion and a head on the pin.

2. The system of claim 1 wherein the at least one spring assembly comprises a plurality of spring assemblies arranged to support the platform.

3. The system of claim 2 wherein each spring assembly further comprises an elastic member retained in tension between the lower end of the outer spring and an adjacent portion of the support structure.

* * * * *